United States Patent
Posti et al.

[11] Patent Number: 5,999,817
[45] Date of Patent: Dec. 7, 1999

[54] METHOD FOR PERFORMING ENCODING IN A CELLULAR NETWORK

[75] Inventors: Harri Posti; Mika Laukkanen, both of Oulu, Finland

[73] Assignee: Nokia Telecommunications Oy, Espoo, Finland

[21] Appl. No.: 08/836,948

[22] PCT Filed: Nov. 8, 1995

[86] PCT No.: PCT/FI95/00610

§ 371 Date: May 9, 1997

§ 102(e) Date: May 9, 1997

[87] PCT Pub. No.: WO96/15637

PCT Pub. Date: May 23, 1996

[30] Foreign Application Priority Data

Nov. 9, 1994 [FI] Finland ................................. 945277

[51] Int. Cl.⁶ ................................................ H04Q 7/20
[52] U.S. Cl. .................. 455/439; 455/436; 455/560; 455/440
[58] Field of Search .................... 455/439, 436, 455/560, 561

[56] References Cited

U.S. PATENT DOCUMENTS

| | | |
|---|---|---|
| 4,924,480 | 5/1990 | Gay et al. ................................. 375/8 |
| 5,497,396 | 3/1996 | Delprat . |
| 5,612,992 | 3/1997 | Dupuy et al. ............................ 379/59 |
| 5,692,105 | 11/1997 | Leppanen et al. ..................... 455/116 |
| 5,758,256 | 5/1998 | Berry et al. ............................. 455/72 |
| 5,835,486 | 11/1998 | Davis et al. ........................... 370/287 |

FOREIGN PATENT DOCUMENTS

93/00778  1/1993  WIPO .

*Primary Examiner*—Wellington Chin
*Assistant Examiner*—Yemane Woldetatios
*Attorney, Agent, or Firm*—IP Group of Pillsbury Madison & Sutro, LLP

[57] ABSTRACT

A method for performing encoding in a cellular network includes, in each cell, at least one base station communicating with terminal equipment within its coverage area, and a mobile switching center controlling the operation of the base stations. In order to improve the transmission quality over a connection between two terminal equipment, when the mobile switching center detects, during call set-up or handover, that the call is between two terminal equipment located within the area of the mobile switching center, the mobile switching center guides the transcoders of base stations communicating with the terminal equipment to a mode in which the transcoders adapt the rate to fit the transmission network, but do not encode the speech signal.

7 Claims, 3 Drawing Sheets

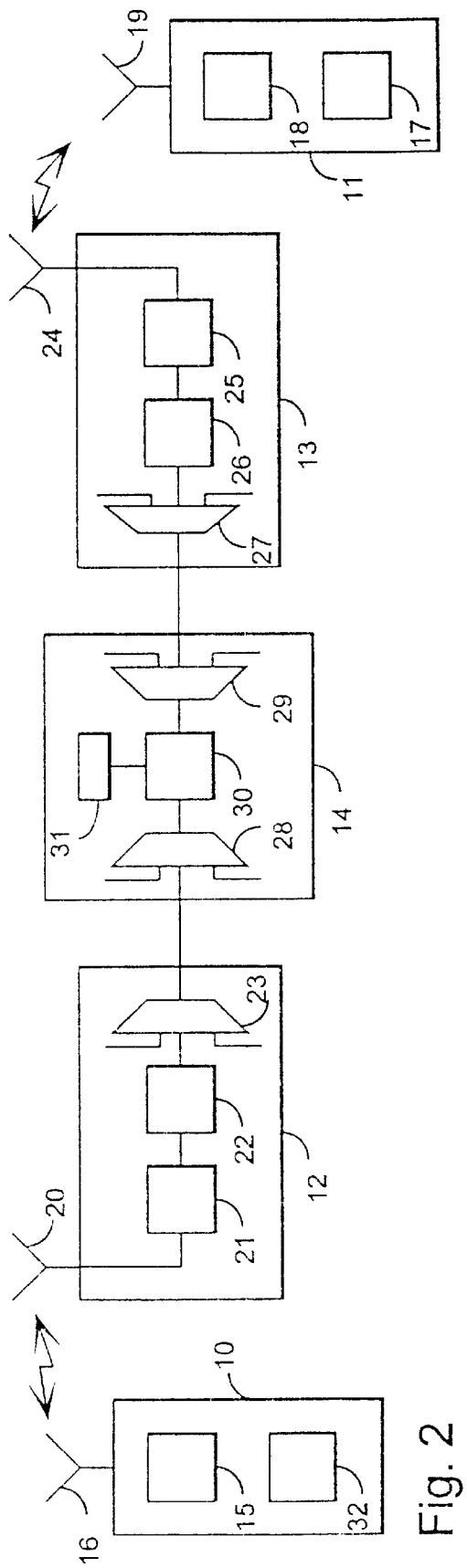

METHOD FOR PERFORMING ENCODING IN A CELLULAR NETWORK

This application is the national phase of international application PCT/FI195/00610 filed Nov. 8, 1995 which designated the U.S.

FIELD OF THE INVENTION

The present invention relates to a method for performing encoding in a cellular network that includes in each cell, at least one base station communicating with terminal equipment within its coverage area, and a mobile switching center controlling operation of the base stations.

BACKGROUND OF THE INVENTION

Digital transmission systems in which speech information is transmitted apply speech coding to convert analog speech into digital form. For example, in a fixed telephone network, analog speech is converted into a digital signal having the bit rate of 64 kbps. In several transmission systems, such as cellular radio systems, the aforementioned transmission rate is impractical since it takes up too much of the transmission capacity. There have been attempts to implement the speech coding used in these systems with as small a transmission band and as low a bit rate as possible.

The transmission band and the bit rate can be reduced by processing digitalized speech with the methods of signal processing, for example, by decreasing redundant information and by compressing speech. At the same time, as these signal processing methods reduce the transmission band required, the quality of the transmitted speech deteriorates. This deterioration is especially detrimental when the process of coding/decoding is performed several times over the connection, as, for example, in a cellular network, when the call is between two terminal equipment.

Several speech coding methods have been developed, and the aim of all of the methods is to obtain a bit rate that is as low as possible without any deterioration in the speech quality. A mean opinion score (MOS), based on listening tests, is generally used as a criterion for speech quality. The table of FIG. 1 shows the MOSs of several known speech coding methods in the case in which the connection has one transcoder and the case in which the connection has two transcoders as when the connection is between two terminal equipments in a cellular radio system. As it can be seen, with two coders, the quality of speech generally deteriorates. This phenomenon is known and there have been attempts to take account for it in the development of speech coding methods, but, even in the latest coders, speech quality is not good when two coders are used over the same connection.

A known arrangement aiming at eliminating the aforementioned problem is disclosed in U.S. Pat. No. 4,924,480. As mentioned above, analog speech is converted into a digital format comprising a 64 kbps signal. This signal is presented in the form of an 8-bit A-law word. In the method disclosed in the reference, the least significant bit (LSB) of this 8-bit word is used so that a coder may manifest its existence to another coder by this bit. In practice, the coder of the transmitter may thus transmit its own synchronization pattern, which is detected by the coder of receiver, in the place of this LSB. When the coders have detected each other's existence, the coders switch to a so-called padding stripping mode in which the coders do not decode the signal for the transmission, but only adapt its transmission rate for the transmission. Successive coding/decoding operations can therefore be avoided. The problem with the disclosed method is that the LSB of each 8-bit A-law PCM word is used for purposes other than speech transmission, and the quality of the transmitted speech therefore deteriorates. Furthermore, the required handshaking procedure between the coders is slow, since each bit in the synchronization pattern must be repeated six times, and each synchronization pattern must be sufficiently long to enable reliable recognition. Also, each synchronization pattern must be repeated at least once.

SUMMARY OF THE INVENTION

The purpose of the present invention is to realize a method by which speech quality over a connection between two terminal equipments located in the area of the same mobile switching center can be improved and the prior art problems can be avoided. Another purpose of the invention is to reduce the transmission delay over a connection between two terminal equipments.

This is achieved with a method for performing encoding in a cellular network including, in each cell, at least one base station communicating with terminal equipment within its coverage area and a mobile switching center controlling operation of the base stations in which, when the mobile switching center detects, during call set-up or handover that the call is between two terminal equipment located within the area of the mobile switching center, the mobile switching center guides the transcoders of base stations communicating with the terminal equipment to a mode in which the transcoders adapt the rate to fit the transmission network, but do not encode the speech signal.

The method according to the invention thus reduces the number of coding/decoding operations to be performed when the connection is between two terminal equipment and the terminal equipment are located in the area of the same mobile switching center. The improvement obtained depends on the speech coding method used, as the table of FIG. 1 illustrates. Since the amount of speech processing can be reduced, the delay over the connection is significantly decreased. Compared with earlier methods, the present method provides improvement both in the speech quality and in the delay since signaling does not have to be performed by the LSBs, but is performed by normal messages used in call set-up.

In the following, the invention will be described in greater detail with reference to the examples according to the accompanying drawings, in which.

BRIEF DESCRIPTION OF THE DRAWINGS

FIG. 1 is a table illustrating different speech coding methods;

FIG. 2 is an example of a cellular radio system wherein the method according to the invention can be applied;

DETAILED DESCRIPTION OF THE CURRE

Figure 3A:
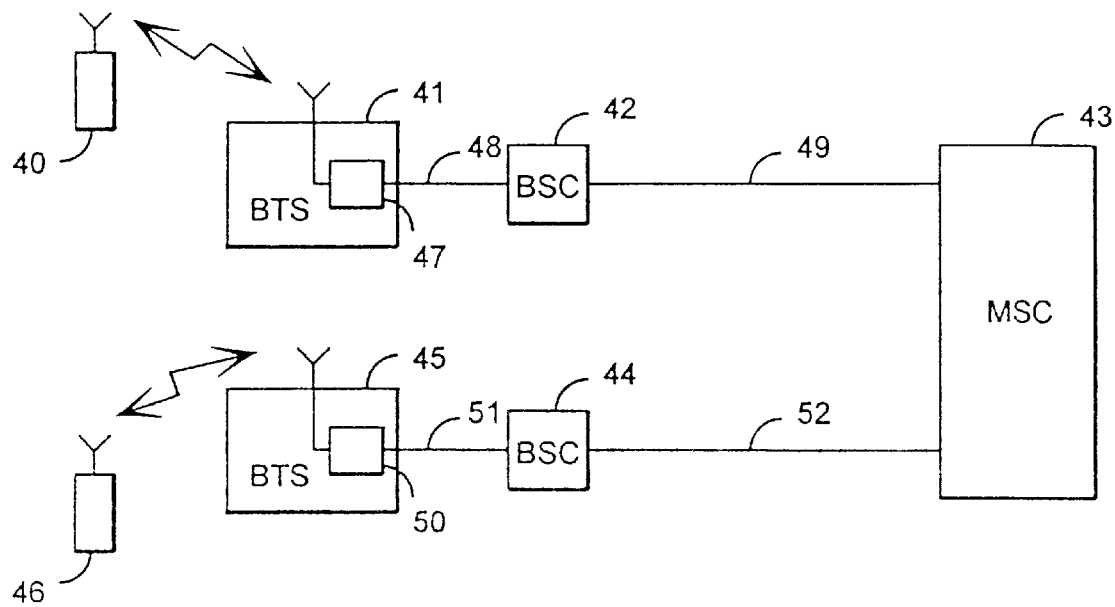
FIGS. 3a and 3b illustrate an example wherein the method according to the invention is applied in a GSM system.

FIG. 2 illustrates a part of the structure of a typical cellular radio system. In FIG. 2, a first mobile terminal equipment 10 communicates with a second mobile terminal equipment 11 via a first base station 12, a mobile switching center 14, and a second base station 13. Correspondingly, the second terminal equipment 11 communicates with the first terminal equipment 10 utilizing the other transmission direction of the same route. The terminal equipment 10 and 11 communicate with the base stations 12 and 13, respectively, via a radio link by antennas 16, 19, 20 and 24. The base stations 12 and 13 communicate with the mobile switching center 14 via digital transmission links realized by either cable connections or radio relay links.

The terminal equipment 10 comprises a coder 32. The input of the coder 32 is a sampled analog signal. The sampling frequency is typically 8 KHz, but this is not essential to the present invention. In the coder 32, the sampled speech signal is coded utilizing a predetermined speech coding algorithm so that the signal bit rate visible at the output is, for example; in the case of GSM; 13 kbps, and in a D-AMPS network, 7.95 kbps. The received signal is supplied to a receiver-transmitter unit 15 where the signal is modulated to a carrier frequency and transmitted via the antenna 16 to the base station 12. In the receiving terminal equipment, the signal received by the antenna 19 is supplied to a transmitter-receiver unit 18 where the signal is demodulated, and is then supplied to a coder 17 where the signal is decoded into its original form. A similar transmission chain also takes place in the opposite transmission direction.

The base station 12 comprises the antenna 20, a transmitter-receiver unit 21, a coder 22, and a multiplexer unit 23. The transmitter-receiver unit 21 operates in a similar manner as the corresponding unit 15 in the terminal equipment and demodulates the signal received by the antenna 20. The input of the coder 22 is the output signal of the transmitter-receiver 21. In the coder 22, the speech signal is decoded in a conventional manner and adapted to the transmission line of the mobile switching center 14, i.e., for example, in the case of the GSM system, this requires a bit rate of 64 kbps. The mobile switching center 14 comprises, multiplexer 28, 29, a 30 coupler through which the call is directed to the correct receiver, and a controller 31 which controls operation of the center.

When a call between two terminal equipment is being established, a terminal equipment first transmits a call set-up message to the base station, which forwards the required data concerning the call to be set up to the mobile switching center. When the mobile switching center detects that the call to be established is between two terminal equipment located in the area of the same mobile switching center, it transmits, a control command among the call set-up messages to a base station communicating with both terminal equipment. The control command guides the respective transcoders of the base stations to a mode in which the transcoders perform, on the signal to be transmitted, the required rate adaptation between the transmission network and the radio path, but do not encode the speech signal.

For example, in the case of the GSM system, a signal arriving from the radio path has a rate of 13 kbps and a signal propagating in the transmission network has in turn the rate of 64 kbps. In the method according to the invention, the coder of the base station does not decode the speech coding of the 13 kbps signal, but converts the coded signal to a 64 kbps format, for example, by adding extra bits at suitable intervals to the signal to be transmitted. Correspondingly, a coder situated at the other end of the transmission chain does not perform speech coding on a 64 kbps signal arriving from the mobile switching center, but it unloads the extra bits added to the signal, thus converting the signal rate to 13 kbps. The arrangement according to the invention, therefore, makes it possible to avoid the second coding/decoding procedure of the signal to be transmitted, wherefore better speech quality is thus obtained. The arrangement requires no additional transmission capacity for controlling the coders, but the control can be performed in connection with normal call set-up messages.

The invention can thus be applied over connections between terminal equipments that are located within the area of one mobile switching center. The method can be utilized both when a call begins and ends in accordance with the aforementioned requirement and when terminal equipment move during a call in such a way that the terminal equipment arrive in the area of the same mobile switching center. The latter case is quite rare, however, since mobile switching centers usually service a broad geographical area.

In the following, the method according to the invention will be described in greater detail utilizing the GSM system as an example, but without being limited to it, however. When the method according to the invention is applied to the GSM system, the transcoders must adapt, during calls between terminal equipment under the same mobile switching center, 13 kbps speech coded with the RPE-LTP method to the rate of 64 kbps, and compose and decompose TRAU frames.

Figure 3B:
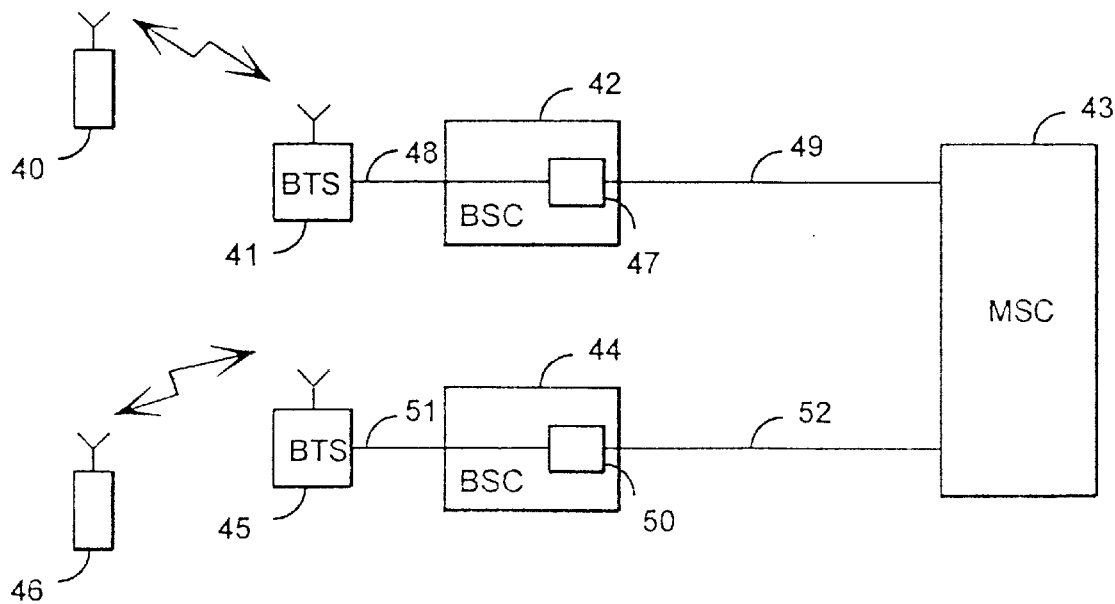

The structure of the GSM system is illustrated in FIGS. 3a and 3b. A more detailed description of the structure of the GSM system can be found for example in *The GSM System for Mobile Communications* by M. Mouly and M-.B. Pautet (published by the authors). The FIGS. 3a and 3b show a first terminal equipment 40, which is located within the coverage area of a first base station 41 (BTS). The first base station 41 communicates via a digital transmission link 48 with a base station controller 42 (BSC), which in turn communicates with a mobile switching center 43 (MSC) over a digital transmission link 49. FIGS 3a and 3b show a second terminal equipment 46, which is located within the coverage area of a second base station 45. The second base station 45 communicates via a digital transmission link 51 with a base station controller 44, which in turn communicates with the mobile switching center 43 over a digital transmission link 52.

In FIG. 3a, transcoder units 47, 50 (TRAU, Transcoder/Rate Adaptor Unit) that perform speech coding/decoding and adapt the rate to fit the transmission network are situated at the base stations 41 and 45, respectively. The physical location of a transcoder unit is not determined in the GSM specifications, thus the unit may also be situated, as in FIG. 3b, for example, at the base station controllers 42 and 44, respectively, or in some other part of the transmission line. The location of the transcoder is not significant to the present invention. The transcoders 47 and 50 thus perform, on the 13 kbps signal arriving from a mobile phone, the decoding of the speech coding and the adaptation to the 64 kbps transmission line, and perform opposite functions on a signal propagating towards the terminal equipment. In FIG. 3a, the rate on transmission lines 48, 49, 51 and 52 is 64 kbps, whereas in FIG. 3b, the transmission rate on transmission lines 48 and 51 is 13 kbps, and on lines 49 and 52, it is 64 kbps.

A new call

Assume first that a new call is set up between two terminal equipments 40 and 46. The first base station 41 receives a call set-up message from the calling terminal equipment 40. The first base station 41 forwards data about the identification number of the called terminal equipment to the mobile switching center 43. The MSC 43 finds out the location of the called terminal equipment by the home location register (HLR) of that terminal equipment. If the terminal equipment is located in the area of the MSC 43, the MSC transmits data about the required transcoder mode to the base station controllers 42, 44 controlling the base stations of the coverage areas of these terminal equipment, by an assignment_ request message of the GSM system (the message is described in the GSM specification 08.08).

Both base station controllers 42, 44 inform the corresponding base stations 41, 45 of the required transcoder mode by an assignment_command message of the GSM system (the message is described in the GSM specification 04.08). In an embodiment of the invention, the base stations 41, 45 utilize the spare bits of the TRAU frames in setting the transcoder mode. In the specification of the GSM system, the TRAU frames comprise five spare bits. One of these bits can be used in the detection of the mode in such a way that when the transcoder is in the normal mode, this bit has the value '0', and when the transcoder mode is to be changed, this bit is set to '1'. The base stations 41, 45 thus set this bit in the TRAU frame to '1', so that the transcoders switch to a mode in which they do not decode the speech coding of the signal arriving from the terminal equipments, but only convert the signal rate to the rate of 64 kbps suitable for the transmission line, and perform corresponding functions in the opposite transmission direction, i.e., adapt the signal arriving from the transmission line to the transmission rate used on the radio path, but do not encode this signal since it is already speech-coded. After this, the call set-up proceeds normally, as, for example, the GMS specification 04.08 describes.

The adaptation of the rate from 13 kbps to 64 kbps can be realized, for example, by adding extra bits to the bits to be transmitted so that the transmission rate increases. Correspondingly, at the receiving end, the extra bits are removed from the 64 kbps signal to obtain the original speech-coded 13 kbps signal.

When the call ends, an empty bit pattern (010101 . . . ) begins to be transmitted in the TRAU frame according to the GSM specifications (08.60), and the transcoders then automatically resume the normal mode.

MSC controlled handover

Figure 4A:
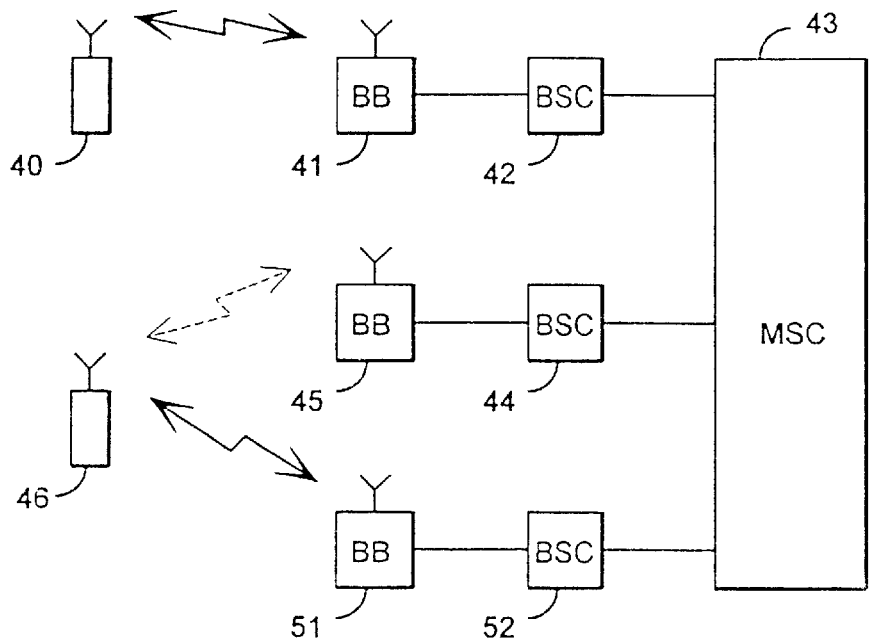
FIGS. 4a and 4b illustrate examples of a handover.
Figure 4B:
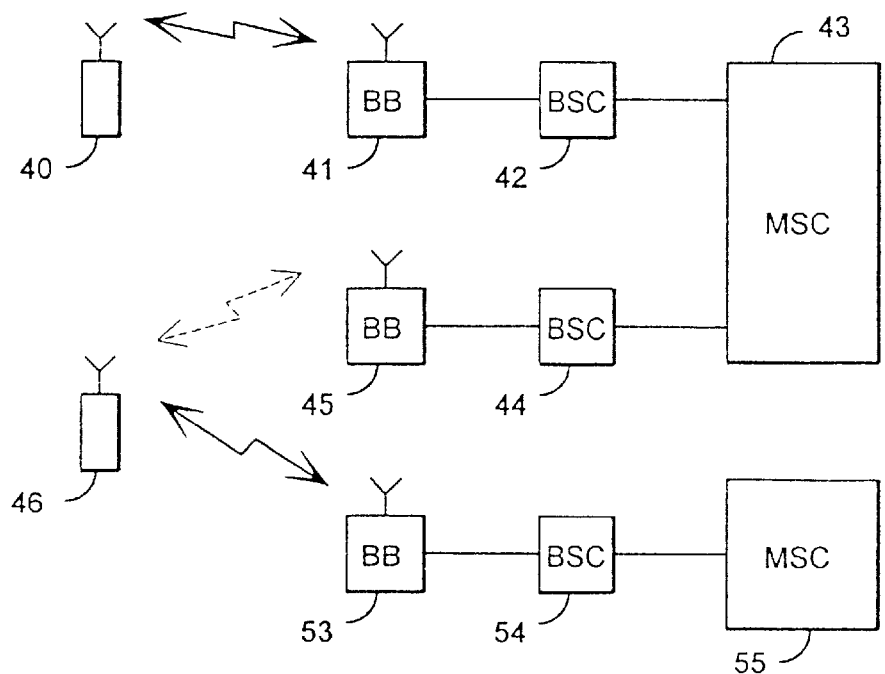

This alternative covers two separate cases: intra MSC handover and inter MSC handover. The situation is illustrated in FIGS. 4*a* and 4*b*.

In case of a handover within the area of the MSC 43, the MSC 43 informs the new BSC 52 of the transcoder mode required on the new channel to be set up in a handover_request message (GSM 08.08). The BSC 52 informs the new base station 51 of the required transcoder mode in a channel_activation message (GSM 08.58). As described above, the base station 51 sets the bit reserved for the purpose in the TRAU frame to '1', so that the transcoder switches to a mode in which it does not decode the speech coding of the signal arriving from the terminal equipments, but only adapts the signal rate to suit the transmission line. From here on, the handover proceeds according to the GSM specifications. It should be noted that, depending on whether the handover occurs within a cell or within a BSC, the BSC or the BTS may remain the same during the handover.

In case of an inter MSC handover, both transcoders must be set to the normal mode since there is no certainty about the kind of coding method applied in the traffic between two MSCs. The transcoder of the new base station 53 is by default in the normal mode, but the transcoder of the base station 41 which remains the same must be directed back to the normal mode. This can be done in two ways.

The first is to perform the internal handover of the base station 41 to the same frequency and time slot that are already used. In such a case, the transcoder of the base station 41 switches to the normal mode as the BTS sets the bit reserved from the TRAU frame to '0', whereupon the transcoder resumes the normal mode.

Another way is a mode_modify_request message transmitted by the BSC 42 to the base station 41. As a result of the message, the base station 41 can set the bit reserved from the TRAU frame to '0', whereupon the transcoder switches to the normal mode. The mode_modify procedure is described in greater detail for example in *The GSM System for Mobile Communications* referred to above.

BSC controlled handover

This alternative also covers two separate cases: intra BTS handover and inter BTS handover.

The BSC informs the new BTS of the required transcoder mode in a channel_activation message (GSM 08.58). As described above, the BTS sets the bit reserved for the purpose in the TRAU frame to '1', whereupon the transcoder switches to a mode in which it does not decode the speech coding of the signal arriving from the terminal equipments, but only adapts the signal rate to suit the transmission line. From here on, the handover proceeds according to the GSM specifications 04.08, 08.08 and 08.58.

Even though the invention is described above with reference to the example according to the accompanying drawings, it is clear that the invention is not restricted thereto, but it can be modified in many ways within the scope of the inventive idea disclosed in the appended claims.

We claim:

1. A method for performing encoding in a cellular network comprising, in each cell, at least one base station communicating with terminal equipment within its coverage area, and a mobile switching center controlling operation of said base stations, comprising:

when said mobile switching center detects, during call set-up or handover, that a call is between two terminal equipment located within said coverage area of said mobile switching center, said mobile switching center guiding transcoders of said base stations communicating with said terminal equipment to a mode in which said transcoders adapt a rate to fit a transmission network, but do not encode a speech signal.

2. The method according to claim 1, wherein, when a connection between said terminal equipment is disconnected, said mobile switching center guides said transcoders of said base stations that were communicating with said terminal equipment to resume a normal mode.

3. The method according to claim 1, wherein said cellular network is a GSM network, and one bit being reserved from a TRAU frame, said bit indicating a mode in which said transcoder should operate.

4. The method according to claim 3, wherein, said mobile switching center controls by messages related to normal call establishment said transcoders of said base stations communicating with said terminal equipment.

5. The method according to claim 3, wherein said bit reserved from said TRAU frame is set to '0', if said transcoder should operate normally, and to '1', if said transcoder should not perform speech coding.

6. The method according to claim 1, wherein, when said handover is performed within said coverage area of said mobile switching center, said transcoder of said base station communicating with said terminal equipment performing said handover is guided during said handover to a mode in which said transcoder adapts said rate to fit said transmission network, but does not encode said speech signal.

7. The method according to claim 1, wherein, when said handover is performed outside said coverage area of said mobile switching center, said transcoder of said base station communicating with said terminal equipment that does not move outside said coverage area of said mobile switching center is guided during said handover to resume a normal mode.

\* \* \* \* \*